(12) United States Patent
Klemen (10) Patent No.: US 7,226,381 B2
(45) Date of Patent: Jun. 5, 2007

(54) NINE-SPEED TRANSMISSIONS WITH FOUR PLANETARY GEAR SETS

(75) Inventor: Donald Klemen, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 175 days.

(21) Appl. No.: 11/071,839

(22) Filed: Mar. 3, 2005

(65) Prior Publication Data

US 2006/0205556 A1 Sep. 14, 2006

(51) Int. Cl.
*F16H 3/62* (2006.01)

(52) U.S. Cl. ...................... 475/275; 475/286

(58) Field of Classification Search ............... 475/275, 475/279, 286, 290, 296
See application file for complete search history.

(56) References Cited

U.S. PATENT DOCUMENTS

| | | | | |
|---|---|---|---|---|
| 4,070,927 A | 1/1978 | Polak | ......................... | 475/286 |
| 4,683,776 A * | 8/1987 | Klemen | ...................... | 475/286 |
| 4,709,594 A | 12/1987 | Maeda | ........................ | 475/280 |
| 5,106,352 A | 4/1992 | Lepelletier | .................. | 475/280 |
| 5,385,064 A | 1/1995 | Reece | .......................... | 74/331 |
| 5,497,867 A | 3/1996 | Hirsch et al. | ............ | 192/48.91 |
| 5,560,461 A | 10/1996 | Loeffler | ................... | 192/53.32 |
| 5,599,251 A | 2/1997 | Beim et al. | .................. | 475/275 |
| 5,641,045 A | 6/1997 | Ogawa et al. | ......... | 192/53.341 |
| 5,651,435 A | 7/1997 | Perosky et al. | ............. | 192/219 |
| 5,975,263 A | 11/1999 | Forsyth | ................... | 192/53.32 |
| 6,053,839 A | 4/2000 | Baldwin et al. | ............ | 475/281 |
| 6,071,208 A | 6/2000 | Koivunen | .................... | 475/275 |
| 6,083,135 A | 7/2000 | Baldwin et al. | ............ | 475/276 |
| 6,176,803 B1 * | 1/2001 | Meyer et al. | ............... | 475/286 |
| 6,217,474 B1 | 4/2001 | Ross et al. | .................. | 475/269 |
| 6,354,416 B1 | 3/2002 | Eo | ........................ | 192/53.341 |
| 6,375,592 B1 | 4/2002 | Takahashi et al. | .......... | 475/262 |
| 6,422,969 B1 | 7/2002 | Raghavan et al. | .......... | 475/276 |
| 6,425,841 B1 | 7/2002 | Haka | .......................... | 475/275 |
| 6,471,615 B1 | 10/2002 | Naraki et al. | ............... | 475/262 |
| 6,558,287 B2 | 5/2003 | Hayabuchi et al. | ......... | 475/271 |
| 6,623,397 B1 | 9/2003 | Raghavan et al. | ......... | 360/96.5 |
| 6,634,980 B1 * | 10/2003 | Ziemer | ........................ | 475/275 |
| 2004/0048716 A1 * | 3/2004 | Ziemer | ....................... | 475/286 |
| 2004/0097324 A1 * | 5/2004 | Ziemer | ....................... | 475/296 |
| 2004/0147358 A1 * | 7/2004 | Biermann | .................... | 475/275 |

FOREIGN PATENT DOCUMENTS

JP 09-126283 5/1997

* cited by examiner

*Primary Examiner*—Sherry Estremsky
*Assistant Examiner*—Edwin A. Young
(74) *Attorney, Agent, or Firm*—Dan L. Thompson (57) ABSTRACT

Nine-speed transmissions are provided that include four planetary gear sets having six torque-transmitting mechanisms and various fixed interconnections to provide nine forward speed ratios and a reverse speed ratio. The powertrain includes an engine and torque converter that is continuously connected to at least one of the planetary gear members and an output member that is continuously connected with another of the planetary gear members. The six torque-transmitting mechanisms are operated in combinations of two. Reduced component speeds and improved ratios are achieved.

18 Claims, 6 Drawing Sheets

| REVERSE | RATIOS | 60 | 62 | 64 | 67 | 68 | 69 |
|---|---|---|---|---|---|---|---|
| | −3.96 | | | X | | X | |
| 1 | 4.00 | X | | | | X | X |
| 2 | 2.88 | X | | | | X | |
| 3 | 2.44 | X | | | X | | X |
| 4 | 1.74 | X | | X | | | |
| 5 | 1.35 | X | X | | | | |
| 6 | 1.00 | X | X | | | | |
| 7 | 0.71 | | X | X | | | |
| 8 | 0.60 | | X | | X | | |
| 9 | 0.53 | | | | | | X |

(X = ENGAGED CLUTCH)

| RATIO SPREAD | |
|---|---|
| RATIO STEPS | |
| REV/1 | −0.99 |
| 1/2 | 1.39 |
| 2/3 | 1.18 |
| 3/4 | 1.40 |
| 4/5 | 1.29 |
| 5/6 | 1.35 |
| 6/7 | 1.40 |
| 7/8 | 1.18 |
| 8/9 | 1.15 |

$$\frac{\text{RING GEAR}}{\text{SUN GEAR}} \text{ TOOTH RATIO:}$$

$$\frac{N_{R1}}{N_{S1}} = 2.61$$

$$\frac{N_{R2}}{N_{S2}} = 1.59$$

$$\frac{N_{R3}}{N_{S3}} = 1.88$$

$$\frac{N_{R4}}{N_{S4}} = 1.88$$

NINE-SPEED TRANSMISSIONS WITH FOUR PLANETARY GEAR SETS

TECHNICAL FIELD

The present invention relates to power transmissions having four planetary gear sets that are controlled by six torque-transmitting devices to provide nine forward speed ratios and a reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions are disclosed in U.S. Pat. No. 4,070,927 issued to Polak on Jan. 31, 1978; and U.S. Pat. No. 6,422,969 issued to Raghavan and Usoro on Jul. 23, 2002.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five- or six-speed devices due to the size and complexity of these transmissions.

Seven-speed transmissions are disclosed in U.S. Pat. No. 6,623,397 issued to Raghavan, Bucknor and Usoro. Eight-speed transmissions are disclosed in U.S. Pat. No. 6,425,841 issued to Haka. The Haka transmission utilizes three planetary gear sets and six torque transmitting devices, including two brakes and two clutches, to provide eight forward speed ratios and a reverse speed ratio. One of the planetary gear sets is positioned and operated to establish two fixed speed input members for the remaining two planetary gear sets. Seven-, eight- and nine-speed transmissions provide further improvements in acceleration and fuel economy over six-speed transmissions. However, like the six-speed transmissions discussed above, the development of seven-, eight- and nine-speed transmissions has been precluded because of complexity, size and cost.

SUMMARY OF THE INVENTION

It is an object of the present invention to provide an improved nine speed transmission having four planetary gear sets controlled to provide nine forward speed ratios and a reverse speed ratio. The various embodiments of the improved transmission provide close ratio steps to potentially improve fuel economy, an overall wide ratio, and substantially equal forward and reverse ratios to allow for improved towing capacity.

In one aspect of the invention, the transmission has four planetary gear sets, each of which includes a first, second and third member, which members may comprise a sun gear, a ring gear or a planet carrier assembly member.

In referring to the first, second and third gear sets in this description, and in the claims, these sets may be counted "first" to "third" in any order in the drawings (i.e., left to right, right to left, etc.). Additionally, the first, second or third members of each gear set may be counted "first" to "third" in any order in the drawings (i.e., top to bottom, bottom to top, etc.) for each gear set.

In another aspect of the invention, unless otherwise specified herein, planet carrier assembly members of each of the planetary gear sets may be single-pinion carriers or double-pinion carriers.

In yet another aspect of the invention, a first interconnecting member continuously interconnects a first member of the first planetary gear set with the first member of the second planetary gear set.

In yet a further aspect of the invention, a second interconnecting member continuously interconnects a second member of the second planetary gear set with either the second member of the first planetary gear set or the first member of the third planetary gear set.

In still a further aspect of the invention, a third interconnecting member continuously interconnects a second member of the third planetary gear set with the first member of the fourth planetary gear set.

In still a further aspect of the invention, a fourth interconnecting member continuously interconnects a third member of the third planetary gear set with the second member of the fourth planetary gear set.

In yet another aspect of the invention, transmission incorporates an input shaft which is continuously connected with a member of the planetary gear sets and an output shaft which is continuously connected with another member of the planetary gear sets.

In a further aspect of the invention, a first torque-transmitting mechanism, such as a clutch, is operable for selectively interconnecting the second member of the third planetary gear set with the input shaft.

In still a further aspect of the invention, a second torque-transmitting mechanism, such as a clutch, is operable for selectively interconnecting the third member of the third planetary gear set with the input shaft.

In still a further aspect of the invention, a third torque-transmitting mechanism, such as a clutch, is operable for selectively interconnecting the third member of either the first or second planetary gear sets with the first member of the third planetary gear set.

In a still further aspect of the invention, a fourth torque-transmitting mechanism, such as a brake, is operable for selectively interconnecting the first member of the third planetary gear set with the stationary member.

In another aspect of the invention, a fifth torque-transmitting mechanism, such as a brake, is operable for selectively interconnecting the second member of the fourth planetary gear set with the stationary member.

In a still further aspect of the invention, a sixth torque-transmitting mechanism, such as a clutch, is operable for selectively interconnecting either the third member of the first planetary gear set with the first member of the third planetary gear set or for selectively interconnecting the second member of the first planetary gear set with the third member of the second planetary gear set.

In still a further aspect of the invention, forward ratio shifts as well as a forward/reverse ratio shift are the single transition type.

In yet another aspect of the invention, the lowest of the forward speed ratios is substantially equivalent to the reverse speed ratio.

In yet another aspect of the invention, a planet carrier assembly member of one of the planetary gear sets is a double-pinion carrier.

In yet another aspect of the invention, the double-pinion carrier may be the member continuously connected with the stationary member.

In still another aspect of the invention, each of the members of one of the planetary gear sets is continuously interconnected with a different member of another of the planetary gear sets or with the stationary member.

In still another aspect of the invention, the six torque-transmitting mechanisms are selectively engageable in combinations of two to yield nine forward speed ratios and a reverse speed ratio.

The resulting transmission provides a significantly wider ratio spread in comparison to transmissions with fewer speed ratios. Additionally, close ratio steps are achieved.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1A, 1B:
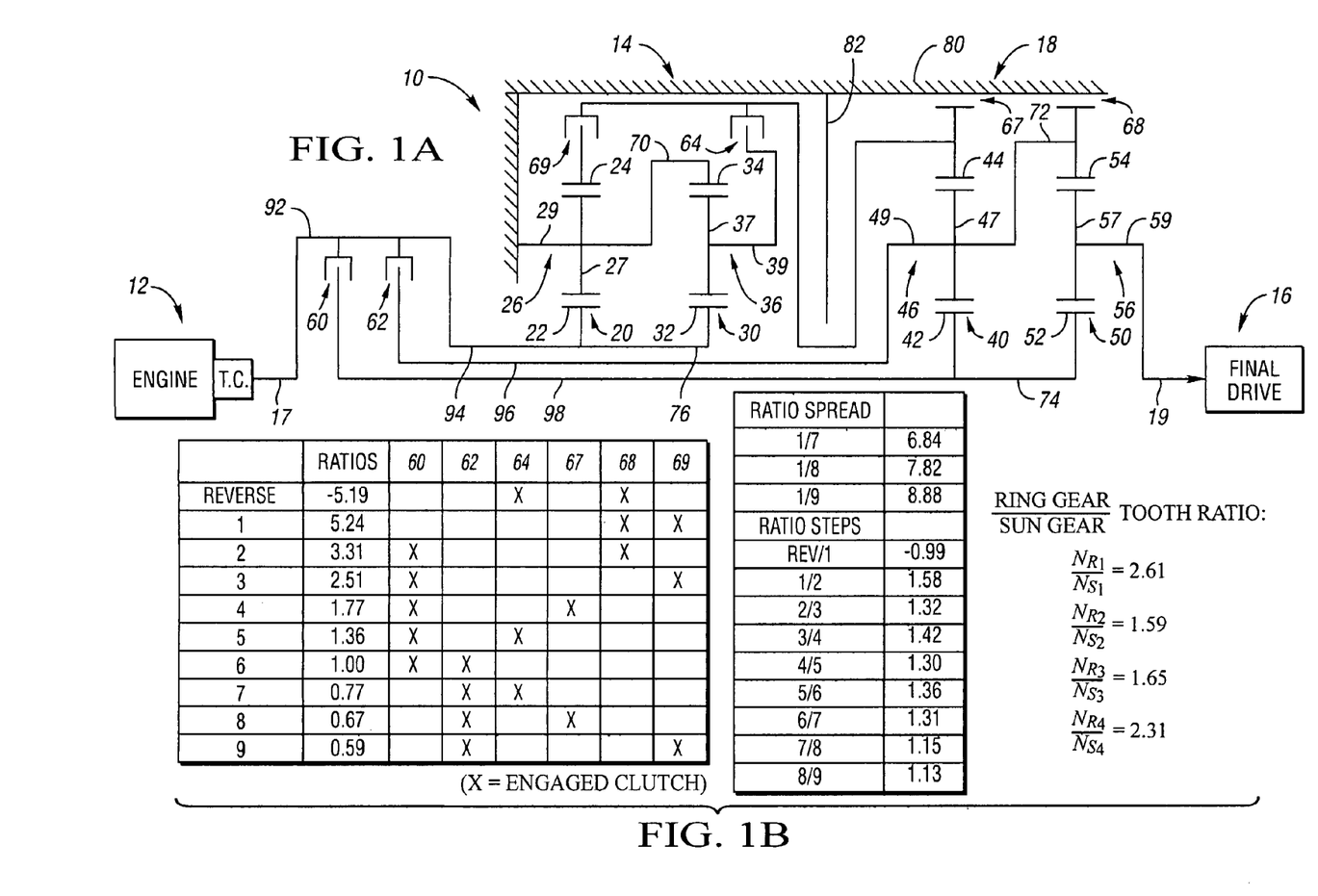
FIG. 1A is a schematic representation of a powertrain including one embodiment of a planetary transmission of the present invention.
FIG. 1B is a truth table and chart depicting some of the operating characteristics of the powertrain shown in FIG. 1A.

Referring to the drawings, wherein like reference numerals represent the same or corresponding parts through the several views, there is shown in FIG. 1A a powertrain 10 having a conventional engine and torque converter 12, a planetary transmission 14 and a conventional final drive mechanism 16.

The planetary transmission 14 includes an input shaft 17 continuously connected with the engine and torque converter 12, a planetary gear arrangement 18, and an output shaft 19 continuously connected with the final drive mechanism 16. The planetary gear arrangement 18 includes four planetary gear sets 20, 30, 40 and 50.

The planetary gear set 20 includes a sun gear member 22, a ring gear member 24, and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on the carrier member 39 and disposed in meshing relationship with both the sun gear member 32 and the ring gear member 34.

The planetary gear set 40 includes a sun gear member 42, a ring gear member 44, and a planet carrier assembly member 46. The planet carrier assembly member 46 includes a plurality of pinion gears 47 rotatably mounted on the carrier member 49 and disposed in meshing relationship with both the sun gear member 42 and the ring gear member 44.

The planetary gear set 50 includes a sun gear member 52, a ring gear member 54, and a planet carrier assembly member 56. The planet carrier assembly member 56 includes a plurality of pinion gears 57 rotatably mounted on the carrier member 59 and disposed in meshing relationship with both the sun gear member 52 and the ring gear member 54.

The input shaft 17 is continuously connected with the sun gear member 22 via a drum 92 to which a first intermediate shaft 94 is continuously interconnected. The input shaft 17 is also continuously connected with the sun gear member 32 via an interconnecting member 76 which interconnects the sun gear members 22 and 32.

The output shaft 19 is continuously connected with the planet carrier assembly member 56. The planet carrier assembly member 26 is continuously connected with the ring gear member 34 through the interconnecting member 70. The planet carrier assembly member 46 is continuously connected with the ring gear member 54 through the interconnecting member 72 and, therefore, to the input shaft 17 (indirectly via the first intermediate shaft 94 and a drum 92).

The sun gear member 42 is continuously connected with the sun gear member 52 through the interconnecting member 74. The sun gear member 22 is continuously connected with the sun gear member 32 through the interconnecting member 76. A housing wall 82 extends between the planetary gear sets 30 and 40. The wall 82 provides support and oil feed for clutches 64 and 69.

The sun gear member 42 is selectively connectable with the input shaft 17 through the clutch 60. The planet carrier assembly member 46 is selectively connectable with the input shaft 17 through the clutch 62. The planet carrier assembly member 36 is selectively connectable with the ring gear member 44 through the clutch 64. The ring gear member 44 is selectively connectable with the transmission housing 80 through the brake 67. The ring gear member 54 is selectively connectable with the transmission housing 80 through the brake 68. The ring gear member 24 is selectively connectable with the ring gear member 44 through the clutch 69.

As shown in FIG. 1B, and in particular the truth table disclosed therein, the torque-transmitting mechanisms are selectively engaged in combinations of two to provide nine forward speed ratios and a reverse speed ratio. The torque-transmitting mechanisms 60, 62, 64, 67, 68 and 69 are preferably of the multiple disk-type, fluid actuated friction-drive establishing device which are commonly used in planetary gear transmissions.

The reverse speed ratio is established with the engagement of the clutch 64 and the brake 68. The clutch 64 connects the planet carrier assembly member 36 with the ring gear member 44, and the brake 68 connects the ring gear member 54 with the transmission housing 80. The sun gear members 22 and 32 rotate at the same speed as the input shaft 17. The planet carrier assembly member 36 rotates at the same speed as the ring gear member 44. The ring gear member 34 does not rotate. The planet carrier assembly member 36 rotates at a speed determined from the speed of the sun gear member 32 and the ring gear/sun gear tooth ratio of the planetary gear set 30. The planet carrier assembly member 46 and the ring gear member 54 do not rotate. The sun gear member 42 rotates at the same speed as the sun gear member 52. The sun gear member 42 rotates at a speed determined from the speed of the ring gear member 44 and the ring gear/sun gear tooth ratio of the planetary gear set 40. The planet carrier assembly member 56 rotates at the same speed as the output shaft 19. The planet carrier assembly member 56, and therefore the output shaft 19, rotates at a speed determined from the speed of the sun gear member 52 and the ring gear/sun gear tooth ratio of the planetary gear set 50. The numerical value of the reverse speed ratio is determined utilizing the ring gear/sun gear tooth ratios of the planetary gear sets 30, 40 and 50.

The first forward speed ratio is established with the engagement of the brake 68 and the clutch 69. The brake 68 connects the ring gear member 54 with the transmission housing 80, and the clutch 69 connects the ring gear member 24 with the ring gear member 44. The sun gear members 22 and 32 rotate at the same speed as the input shaft 17. The planet carrier assembly member 26 and the ring gear member 34 do not rotate. The ring gear member 24 rotates at the same speed as the ring gear member 44. The ring gear member 24 rotates at a speed determined from the speed of the sun gear member 22, and the ring gear/sun gear tooth ratio of the planetary gear set 20. The planet carrier assembly member 46 and the ring gear member 54 do not rotate. The sun gear member 42 rotates at the same speed as the sun gear member 52. The sun gear member 42 rotates at a speed determined from the speed of the ring gear member 44 and the ring gear/sun gear tooth ratio of the planetary gear set 40. The planet carrier assembly member 56 rotates at the same speed as the output shaft 19. The planet carrier assembly member 56, and therefore the output shaft 19, rotates at a speed determined from the speed of the sun gear member 52 and the ring gear/sun gear tooth ratio of the planetary gear set 50. The numerical value of the first forward speed ratio is determined utilizing the ring gear/sun gear tooth ratios of the planetary gear sets 20, 40 and 50.

The second forward speed ratio is established with the engagement of the clutch 60 and the brake 68. The clutch 60 connects the sun gear member 42 with the input shaft 17, and the brake 68 connects the ring gear member 54 with the transmission housing 80. The sun gear members 22, 32, 42 and 52 rotate at the same speed as the input shaft 17. The planet carrier assembly member 46 and the ring gear member 54 do not rotate. The planet carrier assembly member 56 rotates at the same speed as the output shaft 19. The planet carrier assembly member 56, and therefore the output shaft 19, rotates at a speed determined from the speed of the sun gear member 52 and the ring gear/sun gear tooth ratio of the planetary gear set 50. The numerical value of the second forward speed ratio is determined utilizing the ring gear/sun gear tooth ratio of the planetary gear set 50.

The third forward speed ratio is established with the engagement of the clutches 60 and 69. The clutch 60 connects the sun gear member 42 with the input shaft 17, and the clutch 69 connects the ring gear member 24 with the ring gear member 44. The sun gear members 22, 32, 42 and 52 rotate at the same speed as the input shaft 17. The planet carrier assembly member 26 and the ring gear member 34 do not rotate. The ring gear member 24 rotates at the same speed as the ring gear member 44. The ring gear member 24 rotates at a speed determined from the speed of the sun gear member 22 and the ring gear/sun gear tooth ratio of the planetary gear set 20. The planet carrier assembly member 46 rotates at the same speed as the ring gear member 54. The planet carrier assembly member 46 rotates at a speed determined from the speed of the ring gear member 44, the speed of the sun gear member 42 and the ring gear/sun gear tooth ratio of the planetary gear set 40. The planet carrier assembly member 56 rotates at the same speed as the output shaft 19. The planet carrier assembly member 56, and therefore the output shaft 19, rotates at a speed determined from the speed of the ring gear member 54, the speed of the sun gear member 52, and the ring gear/sun gear tooth ratio of the planetary gear set 50. The numerical value of the third forward speed ratio is determined utilizing the ring gear/sun gear tooth ratios of the planetary gear sets 20, 40 and 50.

The fourth forward speed ratio is established with the engagement of the clutch 60 and the brake 67. The clutch 60 connects the ring gear member 42 with the input shaft 17, and the brake 67 connects the ring gear member 44 with the transmission housing 80. The sun gear members 42 and 52 rotate at the same speed as the input shaft 17. The planet carrier assembly member 46 rotates at the same speed as the ring gear member 54. The ring gear member 44 does not rotate. The planet carrier assembly member 46 rotates at a speed determined from the speed of the sun gear member 42 and the ring gear/sun gear tooth ratio of the planetary gear set 40. The planet carrier assembly member 56 rotates at the same speed as the output shaft 19. The planet carrier assembly member 56, and therefore the output shaft 19, rotates at a speed determined from the speed of the sun gear member 52, the speed of the ring gear member 54 and the ring gear/sun gear tooth ratio of the planetary gear set 50.

The numerical value of the fourth forward speed ratio is determined utilizing the ring gear/sun gear tooth ratios of the planetary gear sets 40 and 50.

The fifth forward speed ratio is established with the engagement of the clutches 60 and 64. The clutch 60 connects the sun gear member 42 with the input shaft 17, and the clutch 64 connects the planet carrier assembly member 36 with the ring gear member 44. The sun gear members 22, 32, 42 and 52 rotate at the same speed as the input shaft 17. The planet carrier assembly member 36 rotates at the same speed as the ring gear member 44. The ring gear member 34 and the planet carrier assembly member 26 do not rotate. The planet carrier assembly member 36 rotates at a speed determined from the speed of the sun gear member 32 and the ring gear/sun gear tooth ratio of the planetary gear set 30. The planet carrier assembly member 46 rotates at the same speed as the ring gear member 54. The, planet carrier assembly member 46 rotates at a speed determined from the speed of the sun gear member 42, the speed of the ring gear member 44 and the ring gear/sun gear tooth ratio of the planetary gear set 40. The planet carrier assembly member 56 rotates at the same speed as the output shaft 19. The planet carrier assembly member 56, and therefore the output shaft 19, rotates at a speed determined from the speed of the ring gear member 54, the speed of the sun gear member 52 and the ring gear/sun gear tooth ratio of the planetary gear set 50. The numerical value of the fifth forward speed ratio is determined utilizing the ring gear/sun gear tooth ratios of the planetary gear set 30, 40 and 50.

The sixth forward speed ratio is established with the engagement of the clutches 60 and 62. The clutch 60 connects the sun gear member 42 with the input shaft 17, and the clutch 62 connects the planet carrier assembly member 46 with the input shaft 17. In this configuration, the input shaft 17 is directly connected with the output shaft 19. The numerical value of the sixth forward speed ratio is 1.

The seventh forward speed ratio is established with the engagement of the clutches 62 and 64. The clutch 62 connects the planet carrier assembly member 46 with the input shaft 17, and the clutch 64 connects the planet carrier assembly member 36 with the ring gear member 44. The sun gear members 22 and 32, the planet carrier assembly member 46 and the ring gear member 54 rotate at the same speed as the input shaft 17. The planet carrier assembly member 36 rotates at the same speed as the ring gear member 44. The ring gear member 34 and the planet carrier assembly member 26 do not rotate. The planet carrier assembly member 36 rotates at a speed determined from the speed of the sun gear member 32 and the ring gear/sun gear tooth ratio of the planetary gear set 30. The sun gear member 42 rotates at the same speed as the sun gear member 52. The sun gear member 42 rotates at a speed determined from the speed of the planet carrier assembly member 46, the speed of the ring gear member 44 and the ring gear/sun gear tooth ratio of the planetary gear set 40. The planet carrier assembly member 56 rotates at the same speed as the output shaft 19. The planet carrier assembly member 56, and therefore the output shaft 19, rotates at a speed determined from the speed of the ring gear member 54, the speed of the sun gear member 52, and the ring gear/sun gear tooth ratio of the planet carrier assembly member 50. The numerical value of the seventh forward speed ratio is determined utilizing the ring gear/sun gear tooth ratios of the planetary gear sets 30, 40 and 50.

The eighth forward speed ratio is established with the engagement of the clutch 62 and the brake 67. The clutch 62 connects the planet carrier assembly member 46 with the input shaft 17, and the brake 67 connects the ring gear member 44 with the transmission housing 80. The sun gear members 22 and 32, the planet carrier assembly member 46 and the ring gear member 54 rotate at the same speed as the input shaft 17. The planet carrier assembly member 26, the ring gear member 34 and the ring gear member 44 do not rotate. The sun gear member 42 rotates at the same speed as the sun gear member 52. The sun gear member 42 rotates at a speed determined from the speed of the planet carrier assembly member 46 and the ring gear/sun gear tooth ratio of the planetary gear set 40. The planet carrier assembly member 56 rotates at the same speed as the output shaft 19. The planet carrier assembly member 56, and therefore the output shaft 19, rotates at a speed determined from the speed of the ring gear member 54, the speed of the sun gear member 52 and the ring gear/sun gear tooth ratio of the planetary gear set 50. The numerical value of the eighth forward speed ratio is determined utilizing the ring gear/sun gear tooth ratios of the planetary gear sets 40 and 50.

The ninth forward speed ratio is established with the engagement of the clutches 62 and 69. The clutch 62 connects the planet carrier assembly member 46 with the input shaft 17, and the clutch 69 connects the ring gear member 24 with the ring gear member 44. The sun gear members 22 and 32, the planet carrier assembly member 46 and the ring gear member 54 rotate at the same speed as the input shaft 17. The planet carrier assembly member 26 and the ring gear member 34 do not rotate. The ring gear member 24 rotates at the same speed as the ring gear member 44. The ring gear member 24 rotates at a speed determined from the speed of the sun gear member 22 and the ring gear/sun gear tooth ratio of the planetary gear set 20. The sun gear member 42 rotates at the same speed as the sun gear member 52. The sun gear member 42 rotates at a speed determined from the speed of the planet carrier assembly member 46, the speed of the ring gear member 44 and the ring gear/sun gear tooth ratio of the planetary gear set 40. The planet carrier assembly member 56 rotates at the same speed as the output shaft 19. The planet carrier assembly member 56, and therefore the output shaft 19, rotates at a speed determined from the speed of the ring gear member 54, the speed of the sun gear member 52 and the ring gear/sun gear tooth ratio of the planetary gear set 50. The numerical value of the ninth forward speed ratio is determined utilizing the ring gear/sun gear tooth ratios of the planetary gear sets 20, 40 and 50.

As set forth above, the engagement schedule for the torque-transmitting mechanisms is shown in the truth table of FIG. 1B. This truth table also provides an example of speed ratios that are available utilizing the ring gear/sun gear tooth ratios given by way of example in FIG. 1B. The $N_{R1}/S_{R1}$ value is the tooth ratio of the planetary gear set 20; the $N_{R2}/S_{R2}$ value is the tooth ratio of the planetary gear set 30; the $N_{R3}/S_{R3}$ value is the tooth ratio of the planetary gear set 40 and the $N_{R4}/S_{R4}$ value is the tooth ratio of the planetary gear set 50.

Also, the chart of FIG. 1B describes the ratio steps that are attained utilizing the sample of tooth ratios given. For example, the step ratio between the first and second forward speed ratios is 1.58, while the step ratio between the reverse ratio and the first forward speed ratio is −0.99. It should be noted that the single and double step forward ratio interchanges as well as the forward/reverse interchange are of the single transition variety.

Figure 1C:
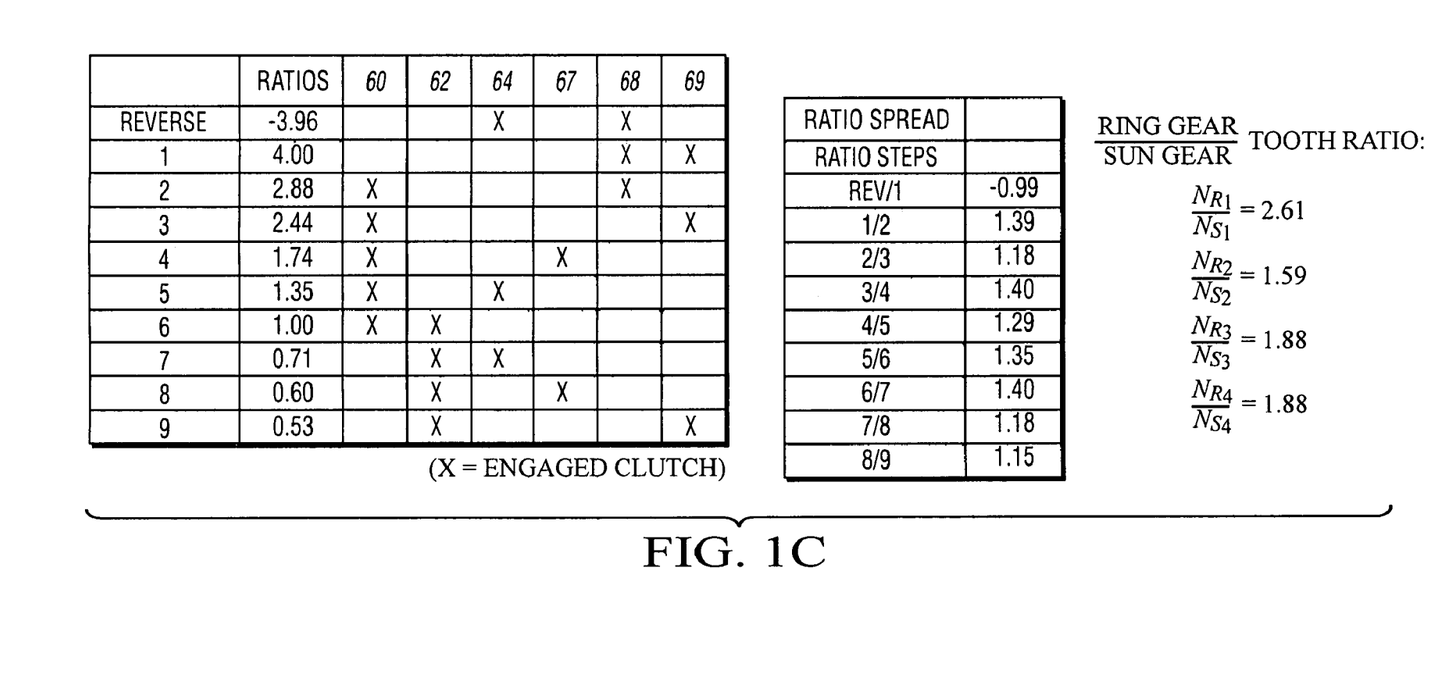
FIG. 1C is a truth table and chart depicting alternative operating characteristics of the powertrain shown in FIG. 1A when alternative ring gear/sun gear tooth ratios are employed.

The chart of FIG. 1C describes speed ratios and ratio steps that are attained by the transmission of FIG. 1A utilizing the alternative sample tooth ratios given. The same engagement schedule for the torque-transmitting mechanisms is used as that of FIG. 1B, as well as in FIG. 2B, FIG. 3C, FIG. 4B and FIG. 5B. Accordingly, single and double step forward ratios as well as the forward/reverse interchanges are of the single transition variety throughout.

The transmission 14 of FIG. 1A provides a simplified layout by interconnecting the sun gear members 42 and 52 and the ring gear member 44 with the planet carrier assembly member 56 of the planetary gear sets 40 and 50. Shafting requirements for the transmission 14 are minimized by: (i) interconnecting the sun gear members 22 and 32 with the drum 92 and therefore with the input shaft 17 via the first intermediate shaft 94, (ii) selectively interconnecting planet carrier assembly member 46 and the ring gear member 54 with the drum 92 and therefore with the input shaft 17 via a second intermediate shaft 96 when the clutch 62 is engaged, (iii) selectively interconnecting the sun gear members 42 and 52 with the input shaft via the third intermediate shaft 98 when the clutch 60 is engaged, and (iv) by creating the intermediate shafts 94, 96, 98 such that they are coaxially disposed. This allows for a compact arrangement. As is apparent from the speed ratios shown in the truth table of FIG. 1B, the transmission 14 provides a deep ratio, progressive step solution. The speed ratios for Reverse L and the first forward speed ratio are nearly identical (although reversed in direction from one another). The first forward speed is a very deep ratio at 5.766. This is useful for towing applications. Additionally, substantially equivalent ratio steps are provided throughout along with a wide ratio spread of 8.88. Also, all planetary gear sets in FIG. 1A are of the simple (single planet) type design.

Figures 2A, 2B:
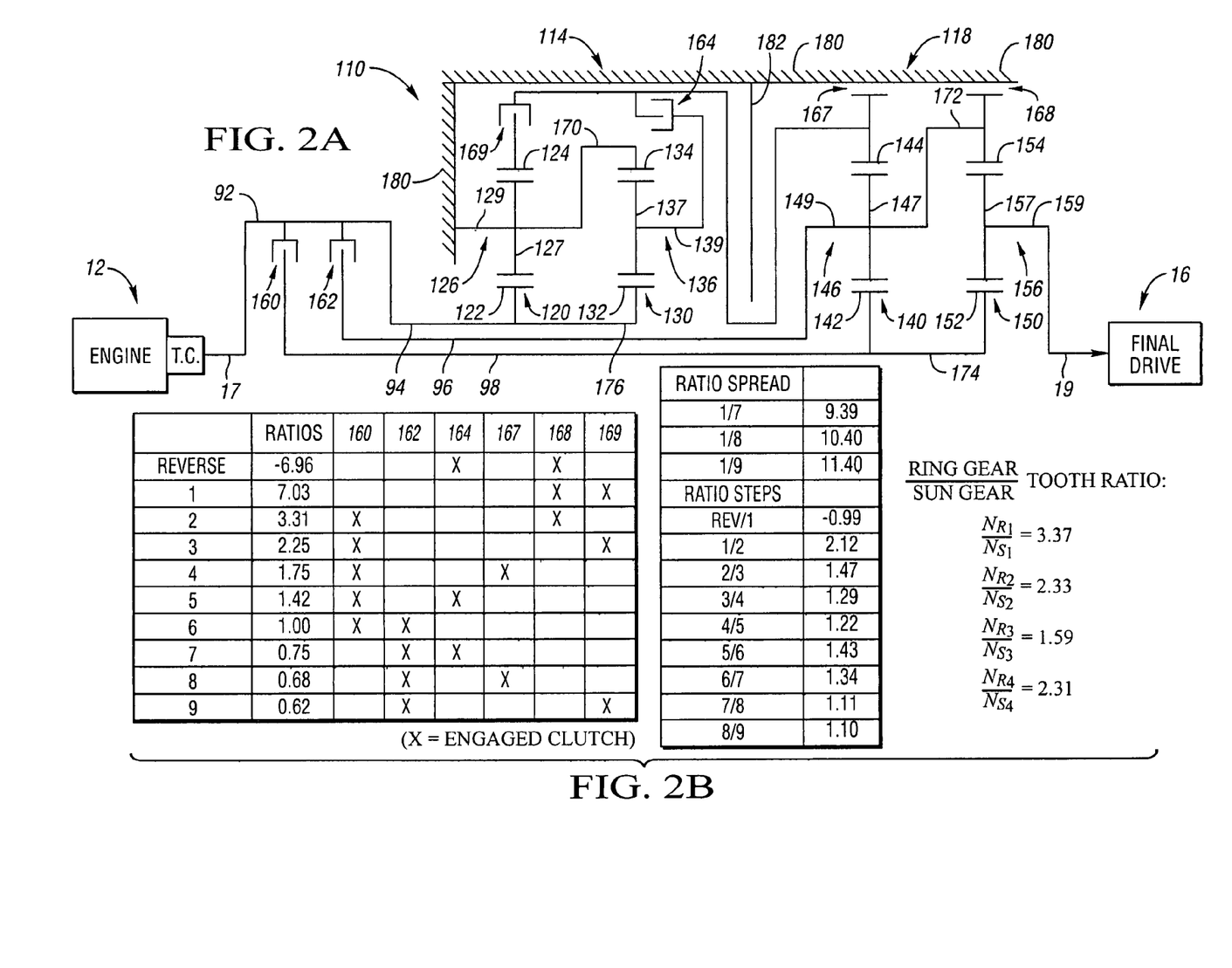
FIG. 2A is a schematic representation of a powertrain having a second embodiment of a planetary transmission of the present invention.
FIG. 2B is a truth table and chart depicting some of the operating characteristics of the powertrain shown in FIG. 2A.

FIG. 2A shows a powertrain 110 having a conventional engine and torque converter 12, a planetary transmission 114, and a conventional final drive mechanism 16.

The planetary transmission 114 includes an input shaft 17 continuously connected with the engine and torque converter 12, a planetary gear arrangement 118, and an output shaft 19 continuously connected with the final drive mechanism 16. The planetary gear arrangement 118 includes four planetary gear sets 120, 130, 140 and 150.

The planetary gear set 120 includes a sun gear member 122, a ring gear member 124, and a planet carrier assembly member 126. The planet carrier assembly member 126 includes a plurality of pinion gears 127 rotatably mounted on the carrier member 129 and disposed in meshing relationship with both the sun gear member 122 and the ring gear member 124.

The planetary gear set 130 includes a sun gear member 132, a ring gear member 134 and a planet carrier assembly member 136. The planet carrier assembly member 136 includes a plurality of pinion gears 137 rotatably mounted on the carrier member 139 disposed in meshing relationship with both the sun gear member 132 and the ring gear member 134.

The planetary gear set 140 includes a sun gear member 142, a ring gear member 144, and a planet carrier assembly member 146. The planet carrier assembly member 146 includes a plurality of pinion gears 147 rotatably mounted on the carrier member 149 and disposed in meshing relationship with both the sun gear member 142 and the ring gear member 144.

The planetary gear set 150 includes a sun gear member 152, a ring gear member 154, and a planet carrier assembly member 156. The planet carrier assembly member 156 includes a plurality of pinion gears 157 rotatably mounted on the carrier member 159 and disposed in meshing relationship with both the sun gear member 152 and the ring gear member 154.

The planetary gear arrangement 118 also includes six torque-transmitting mechanisms 160, 162, 164, 167, 168 and 169. The torque-transmitting mechanisms 162, 164, 166 and 169 are rotating type torque-transmitting mechanisms, commonly termed clutches. The torque-transmitting mechanisms 167 and 168 are stationary type torque-transmitting mechanisms, commonly termed brakes or reaction clutches.

The input shaft 17 is continuously connected with the sun gear member 122, and the output shaft 19 is continuously connected with the planet carrier assembly member 156. The planet carrier assembly member 126 is continuously connected with the ring gear member 134 through the interconnecting member 170. The planet carrier assembly member 146 is continuously connected with the ring gear member 154 through the interconnecting member 172. The sun gear member 142 is continuously connected with the sun gear member 152 through the interconnecting member 174. The sun gear member 122 is continuously connected with the sun gear member 132 through the interconnecting member 176. The planet carrier assembly member 126 is continuously connected with the transmission housing 180. A housing wall 182 extends between the planetary gear sets 30 and 40.

The sun gear member 142 (and therefore the sun gear member 152 due to interconnecting member 174) is selectively connectable with the input shaft 17 through the clutch 160. The planet carrier assembly member 146 (and therefore the ring gear member 154 due to interconnecting member 172) is selectively connectable with the input shaft 17 through the clutch 162. The planet carrier assembly member 136 is selectively connectable with the ring gear member 144 through the clutch 164. The ring gear member 144 is selectively connectable with the transmission housing 180 through the brake 167. The ring gear member 154 is selectively connectable with the transmission housing 180 through the brake 168. The ring gear member 124 is selectively connectable with the ring gear member 144 through the clutch 169.

The truth table of FIG. 2B describes the engagement sequence utilized to provide nine forward speed ratios and a reverse speed ratios in the planetary gear arrangement 118 shown in FIG. 2A. As shown and described above for the configuration of FIG. 1A, those skilled in the art will understand from the truth table of FIG. 2B how the speed ratios shown are established through the planetary gear sets 120, 130, 140 and 150.

The truth table of FIG. 2B also provides an example of the ratios that can be attained with the planetary gear sets shown in FIG. 2A utilizing the sample tooth ratios given in FIG. 2B. The $N_{R1}/S_{R1}$ value is the tooth ratio of the planetary gear set 120; the $N_{R2}/S_{R2}$ value is the tooth ratio of the planetary gear set 130; the $N_{R3}/S_{R3}$ value is the tooth ratio of the planetary gear set 140; and the $N_{R4}/S_{R4}$ value is the tooth ratio of the planetary gear set 150.

Also shown in FIG. 2B are the ratio steps between the single step ratios in the forward direction as well as the Reverse to first forward speed ratio step. For example, the first to second step ratio is 2.12. It should also be noted that the single step and double step forward ratio interchanges as well as the forward/reverse interchange are of the single transition variety.

Notably, all planetary gear sets utilize single carrier members. The low gear ratio (first forward speed) is 7.03, which demonstrates a range of operation with respect to the low gear ratio 5.24 of the transmission of FIG. 1A. The transmissions 14 of FIG. 1A and 114 of FIG. 2A are similar in that similar clutches 69 and 169 control the selective interconnection of the planetary gear sets 20, 120, respectively, while similar clutches 64 and 164 control the selective interconnection of planetary gear sets 30, 130, respectively.

Figure 3A:
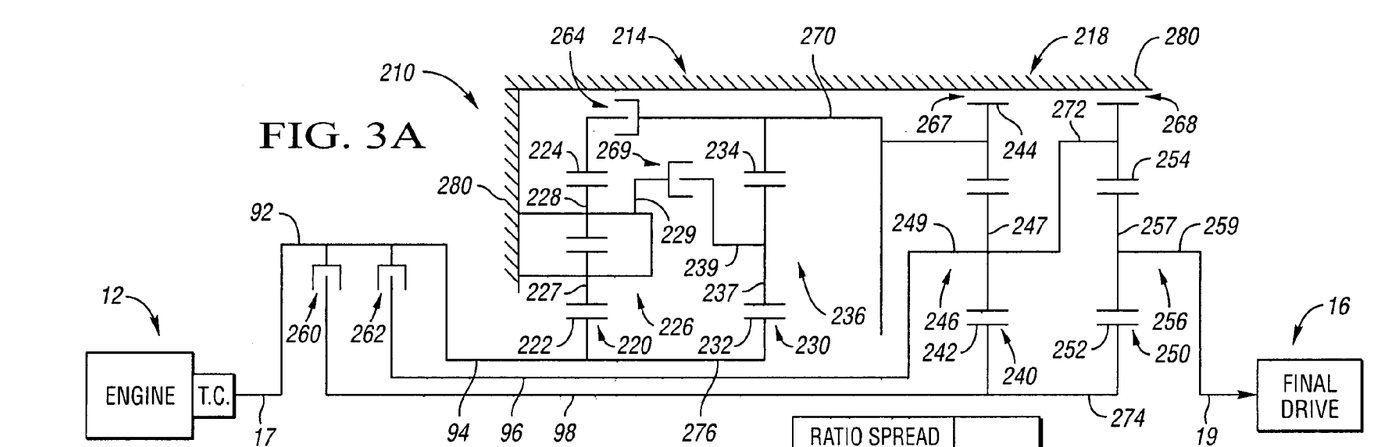
FIG. 3A is a schematic representation of a powertrain incorporating a third embodiment of a planetary transmission of the present invention.

Turning to FIG. 3A, a powertrain 210 includes the engine and torque converter 12, a planetary transmission 214 and a final drive mechanism 16. The planetary transmission 214 includes an input shaft 17 continuously connected with the engine and torque converter 12, a planetary gear arrangement 218, and an output shaft 19 continuously connected with the final drive mechanism 16. The planetary gear arrangement 218 includes four planetary gear sets 220, 230, 240, and 250.

The planetary gear set 220 includes a sun gear member 222, a ring gear member 224 and a planet carrier assembly member 226. The planet carrier assembly member 226 is of the compound planetary type and includes pinion gears 227 and 228 rotatably mounted on a carrier member 229. The pinion gear 227 is disposed in meshing relationship with the sun gear member 222 and the pinion gear 228. The pinion gear 228 is disposed in meshing relationship with the pinion gear 227 and the ring gear member 224.

The planetary gear set 230 includes a sun gear member 232, a ring gear member 234 and a planet carrier assembly member 236. The planet carrier assembly member 236 includes a plurality of pinion gears 237 rotatably mounted on a carrier member 239 and disposed in meshing relationship with both the sun gear member 232 and the ring gear member 234.

The planetary gear set 240 includes a sun gear member 242, a ring gear member 244 and a planet carrier assembly member 246. The planet carrier assembly member 246 includes a plurality of pinion gears 247 rotatably mounted on a carrier member 249 and disposed in meshing relationship with both the sun gear member 242 and the ring gear member 244.

The planetary gear set 250 includes a sun gear member 252, a ring gear member 254, and a planet carrier assembly member 256. The planet carrier assembly member 256 includes a plurality of pinion gears 257 rotatably mounted on a carrier member 259 and disposed in meshing relationship with both the sun gear member 252 and the ring gear member 254.

The planetary gear arrangement 218 also includes six torque-transmitting mechanisms 260, 262, 264, 267, 268, and 269. The torque-transmitting mechanisms 260, 262, and 264 are rotating type torque-transmitting mechanisms, commonly termed clutches. The torque-transmitting mechanisms 267, 268 and 269 are stationary type torque-transmitting mechanisms, commonly termed brakes or reaction clutches.

The input shaft 17 is continuously connected with the sun gear member 222. The output shaft 19 is continuously connected with the planet carrier assembly member 256. The ring gear member 234 is continuously connected with the ring gear member 244 through the interconnecting member 270. The planet carrier assembly member 246 is continuously connected with the ring gear member 254 through the interconnecting member 272. The sun gear member 242 is continuously connected with the sun gear member 252 through the interconnecting member 274. The sun gear member 222 is continuously connected with the sun gear member 232 through the interconnecting member 276. The planet carrier assembly member 226 is continuously connected with the stationary member 280.

The sun gear member 242 (and therefore the sun gear member 252) is selectively connectable with the input shaft 17 through the clutch 260. The planet carrier assembly member 246 (and therefore the ring gear member 254) is selectively connectable with the input shaft 17 through the clutch 262. The ring gear member 224 is selectively connectable with the ring gear member 234 through the clutch 264. The ring gear member 244 is selectively connectable with the transmission housing 280 through the brake 267. The ring gear member 254 is selectively connectable with the transmission housing 280 through the brake 268. The planet carrier assembly member 236 is selectively connectable with the planet carrier assembly member 226 and therefore the transmission housing 280 through the clutch 269.

Figure 3B:
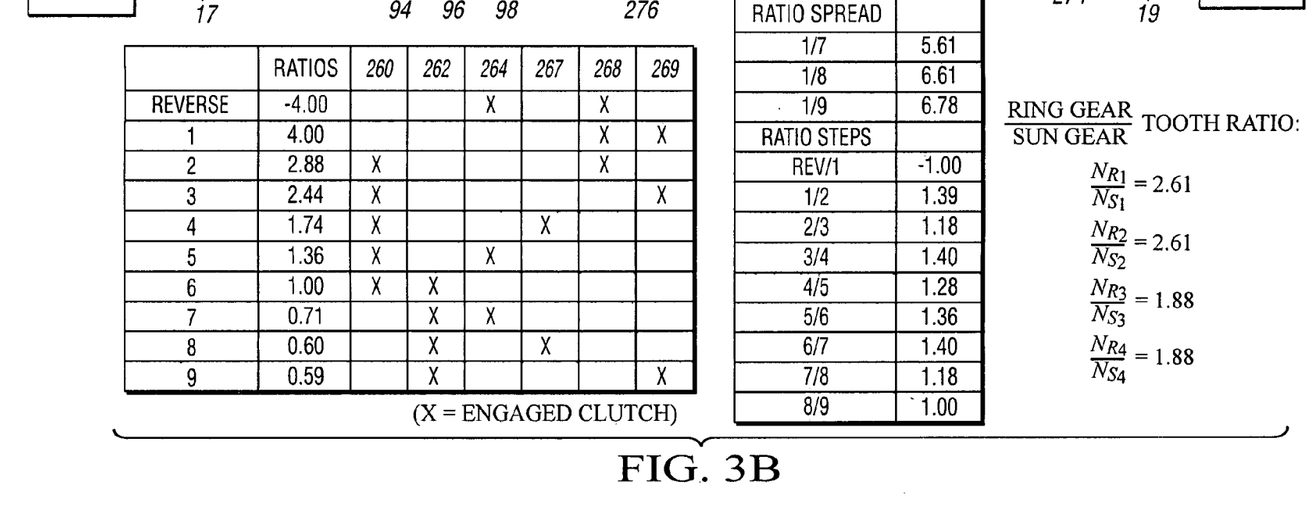
FIG. 3B is a truth table and chart depicting some of the operating characteristics of the powertrain shown in FIG. 3A.

The truth table of FIG. 3B describes the engagement sequence utilized to provide nine forward speed ratios and a reverse speed ratio in the planetary gear arrangement 218 shown in FIG. 3A. As shown and described above for the configuration of FIG. 1A, those skilled in the art will understand from the truth table of FIG. 3B how the speed ratios are established through the planetary gear sets 220, 230, 240 and 250. The truth table of FIG. 3B also provides an example of the ratios that can be attained with the planetary gear arrangement 218 shown in FIG. 2A utilizing the sample tooth ratios given in FIG. 2B. The $N_{R1}/S_{R1}$ value is the tooth ratio of the planetary gear set 220; the $N_{R2}/S_{R2}$ value is the tooth ratio of the planetary gear set 230; the $N_{R3}/S_{R3}$ value is the tooth ratio of the planetary gear set 240; and the $N_{R4}/S_{R4}$ value is the tooth ratio of the planetary gear set 250. Also shown in FIG. 3B are the ratio steps between the single step ratios in the forward direction as well as the Reverse to first forward speed ratio step. For example, the first to second step ratio is 1.39. By utilizing a compound type planet carrier assembly member 226, pinion gear 228 is available to allow the clutch 269 to operate as a brake to selectively interconnect the planet carrier 239 with the transmission housing 280. The compound planet carrier assembly member 226 allows the carrier member 229, which is grounded (i.e., continuously interconnected with the transmission housing 280) to also provide a ground and a piston housing for the clutch 269. Notably, clutches 64, 164 and 264 provide a positive speed rotation to ring gears 44, 144 and 244 in FIGS. 1A, 2A, and 3A respectively. Clutches 69, 169 and 269 provide negative speed to ring gears 44, 144 and 244 in FIGS. 1A, 2A and 3A, respectively.

Figures 4A, 4B:
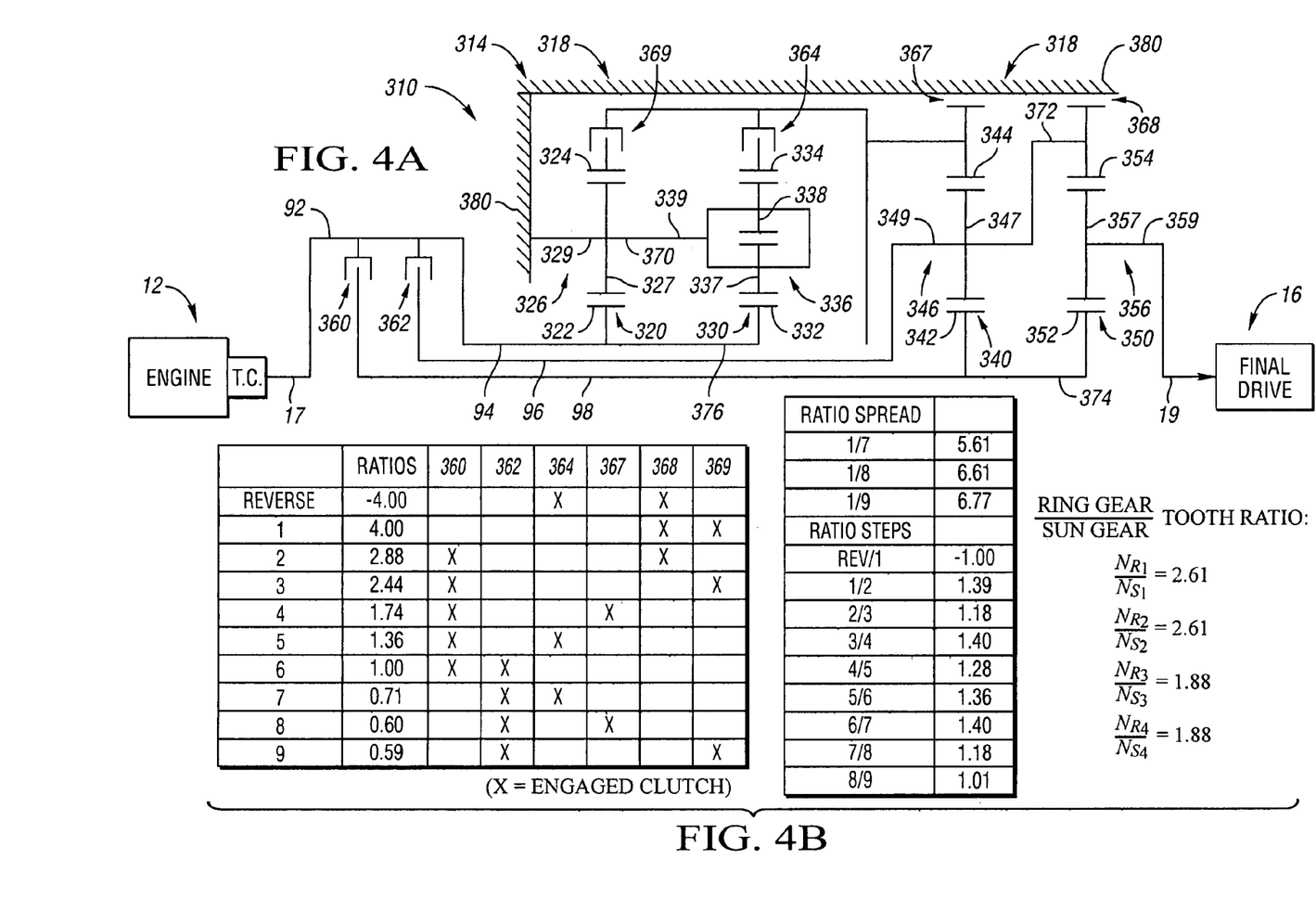
FIG. 4A is a schematic representation of a powertrain incorporating a fourth embodiment of a planetary transmission of the present invention.
FIG. 4B is a truth table and chart depicting some of the operating characteristics of the powertrain shown in FIG. 4A.

Turning to FIG. 4A, a powertrain 310 includes the engine and torque converter 12, a planetary transmission 314 and a final drive mechanism 16. The planetary transmission 314 includes an input shaft 17 continuously connected with the engine and torque converter 12, a planetary gear arrangement 318, and a output shaft 19 continuously connected with the final drive mechanism 16. The planetary gear arrangement 318 includes four planetary gear sets 320, 330, 340 and 350.

The planetary gear set 320 includes a sun gear members 322, a ring gear member 324 and a planet carrier assembly member 326. The planet carrier assembly member 326 includes a plurality of pinion gears 327 rotatably mounted on a carrier member 329 and disposed in meshing relationship with both the sun gear member 322 and the ring gear member 324.

The planetary gear set 330 includes a sun gear member 332, a ring gear member 334 and a planet carrier assembly member 336. The planet carrier assembly member 336 includes pinion gears 337 and 338 rotatably mounted on a carrier member 339. Pinion gear 337 is disposed in meshing relationship with the sun gear member 332 and pinion gear 338. Pinion gear 338 is disposed in meshing relationship with the pinion gear 337 and the ring gear member 334.

The planetary gear set 340 includes a sun gear member 342, a ring gear member 344 and a planet carrier assembly member 346. The planet carrier assembly member 346 includes a plurality of pinion gears 347 rotatably mounted on a carrier member 349 disposed in meshing relationship with both the sun gear member 342 and the ring gear member 344.

The planetary gear set 350 includes a sun gear member 352, a ring gear member 354 and planet carrier assembly member 356. The planet carrier assembly member 356 includes a plurality of pinion gears 357 rotatably mounted on a carrier member 359 and disposed in meshing relationship with both the sun gear member 352 and the ring gear member 354.

The planetary gear arrangement 318 also includes six torque-transmitting mechanisms 360, 362, 364, 367, 368 and 369. The torque-transmitting mechanisms 360, 362, 364 and 369 are rotating type torque-transmitting mechanisms, commonly termed clutches. The torque-transmitting mechanisms 367 and 368 are stationary type torque-transmitting mechanism, commonly termed brakes or reaction clutches.

The input shaft 17 is continuously connected with the sun gear member 322, and the output shaft 19 is continuously connected with the planet carrier assembly member 356. The planet carrier assembly member 326 is continuously connected with the planet carrier assembly member 336 through the interconnecting member 370. The planet carrier assembly member 346 is continuously connected with the ring gear member 354 through the interconnecting member 372. The sun gear member 342 is continuously connected with the sun gear member 352 through the interconnecting member 374. The sun gear member 322 is continuously connected with the sun gear member 332 through the interconnecting member 376. The planet carrier assembly member 326 is continuously connected with the transmission housing 380.

The sun gear member 342 (and therefore the sun gear member 352 due to the interconnecting member 374) is selectively connectable with the input shaft 17 through the clutch 360. The planet carrier assembly member 346 (and therefore the ring gear member 354 due to the interconnecting member 372) is selectively connectable with the input shaft 17 through the clutch 362. The ring gear member 334 is selectively connectable with the ring gear member 344 through the clutch 364. The ring gear member 344 is selectively connectable with the transmission housing 380 through the brake 367. The ring gear member 354 is selectively connectable with the transmission housing 380 through the brake 368. The ring gear member 324 is selectively connectable with the ring gear member 344 through the clutch 369.

The truth table of FIG. 4B describes the engagement sequence utilized to provide nine forward speed ratios and a reverse speed ratio in the planetary gear arrangement 318 shown in FIG. 4A. As shown and described above for the configuration of FIG. 1A, those skilled in the art will understand from the truth table of FIG. 3B how the speed ratios are established through the planetary gear sets 320, 330, 340 and 350. The truth table of FIG. 4B also provides an example of the ratios that can be attained with the planetary gear arrangement 318 shown in FIG. 3A utilizing the sample truth ratios given in FIG. 3B. The $N_{R1}/S_{R1}$ value is of the tooth ratio of the planetary gear set 220; the $N_{R2}/S_{R2}$ value is the tooth ratio of the planetary gear set 230; the $N_{R3}/S_{R3}$ value is the tooth ratio of the planetary gear set 240; and the $N_{R4}/S_{R4}$ value is the tooth of the planetary gear set 250. Also shown in FIG. 4B are the ratio steps between the single step ratios in the forward direction as well as the Reverse to first forward speed ratio step. For example, the first to second step ratio is 1.39.

Notably, the planetary gear arrangement 318 of FIG. 4A utilizes a simple planet carrier assembly member 326 continuously connected with a compound planet carrier assembly member 336 to effectively establish both carrier members 329 and 339 as a common component (i.e., the carriers 339 and 339 are commonly grounded to the transmission housing 380). This enables a common number of sun gear member and ring gear member teeth in planetary gear sets 320 and 330 to provide a first forward speed ratio equal to the reverse speed ratio. The ratio is shown as 4.00 for both the first forward speed ratio and the reverse speed ratio; however, a substantially deeper ratio could be achieved by utilizing differing ring gear/sun gear tooth ratios. Finally, the planetary gear sets 320 and 330 could be interchanged in position and yet still provide the same speed ratios shown in FIG. 4B.

Figure 5A:
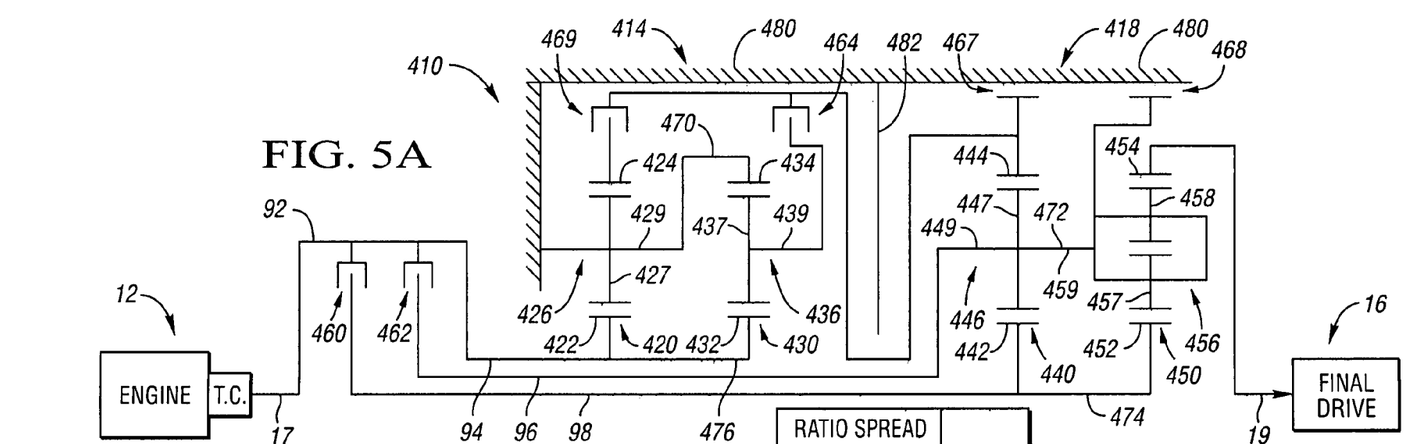
FIG. 5A is a schematic representation of a powertrain incorporating a fifth embodiment of a planetary transmission of the present invention.

Turning to FIG. 5A, a powertrain 410 includes the engine and torque converter 12, a planetary transmission 414 and a final drive mechanism 16. The planetary transmission 414 includes an input shaft 17 continuously connected with the engine and torque converter 12, a planetary gear arrangement 418, and an output shaft 19 continuously connected with the final drive mechanism 19. The planetary gear arrangement 418 includes four planetary gear sets 420, 430, 440, and 450.

The planetary gear set 420 includes a sun gear member 422, a ring gear member 424 and a planet carrier assembly member 426. It includes a plurality of pinion gears 427 rotatably mounted on a carrier member 429 and disposed meshing relationship with both the sun gear member 422 and the ring gear member 424.

The planetary gear set 430 includes a sun gear member 432, a ring gear member 434 and a planet carrier assembly member 436. The planet carrier assembly member 436 includes a plurality of pinion gears 437 rotatably mounted on a carrier member 439 and disposed in meshing relationship with both the sun gear member 432 and the ring gear member 434.

The planetary gear set 440 includes a sun gear member 442, a ring gear member 444 and a planet carrier assembly member 446. The planet carrier assembly member 446 includes a plurality of pinion gears 447 rotatably mounted on a carrier member 449 and disposed in meshing relationship with both the sun gear member 442 and the ring gear member 444.

The planetary gear set 450 includes a sun gear member 452, a ring gear member 454 and a planet carrier assembly member 456. The planet carrier assembly member 456 includes pinion gears 457 and 458 rotatably mounted on a carrier member 459. Pinion gear 457 is disposed in meshing relationship with the sun gear member 452 and pinion gear 458. Pinion gear 458 is disposed in meshing relationship with the pinion gear 457 and the ring gear member 454.

The planetary gear arrangement 418 also includes six torque-transmitting mechanisms 460, 462, 464, 467, 468 and 469. The torque-transmitting mechanisms 460, 462, 464 and 469 are rotating type torque-transmitting mechanisms, commonly termed clutches. The torque-transmitting mechanisms 467 and 468 are stationary torque-transmitting mechanisms, commonly termed brakes or reaction clutches.

The input shaft 17 is continuously connected with the sun gear member 422, and the output shaft 19 is continuously connected with the ring gear member 454. The planet carrier assembly member 426 is continuously connected with the ring gear member 434 through the interconnecting member 470. The planet carrier assembly member 446 is continuously connected with the planet carrier assembly member 456 through the interconnecting member 472. The sun gear member 442 is continuously connected with the sun gear member 452 through the interconnecting member 474. The sun gear member 422 is continuously connected with the sun gear member 432 through the interconnecting member 476. The planet carrier assembly member 426 is continuously connected with the transmission housing 480. Housing wall 482 extends between planetary gear sets 430 and 440.

The sun gear member 442 (and therefore the sun gear member 452 due to the interconnecting member 474) is selectively connectable with the with the input shaft 17 through the clutch 460. The planet carrier assembly member 446 (and therefore the planet carrier assembly member 456 due to the interconnecting member 472) is selectively connectable with the input shaft 17 through the clutch 462. The planet carrier assembly member 436 is selectively connectable with the ring gear member 444 through the clutch 464. The ring gear member 444 is selectively connectable with the transmission housing 480 through the brake 467. The planet carrier assembly member 456 is selectively connectable with the transmission housing 480 through the brake 468. The ring gear member 424 is selectively connectable with the ring gear member 444 through the clutch 469.

Figure 5B:
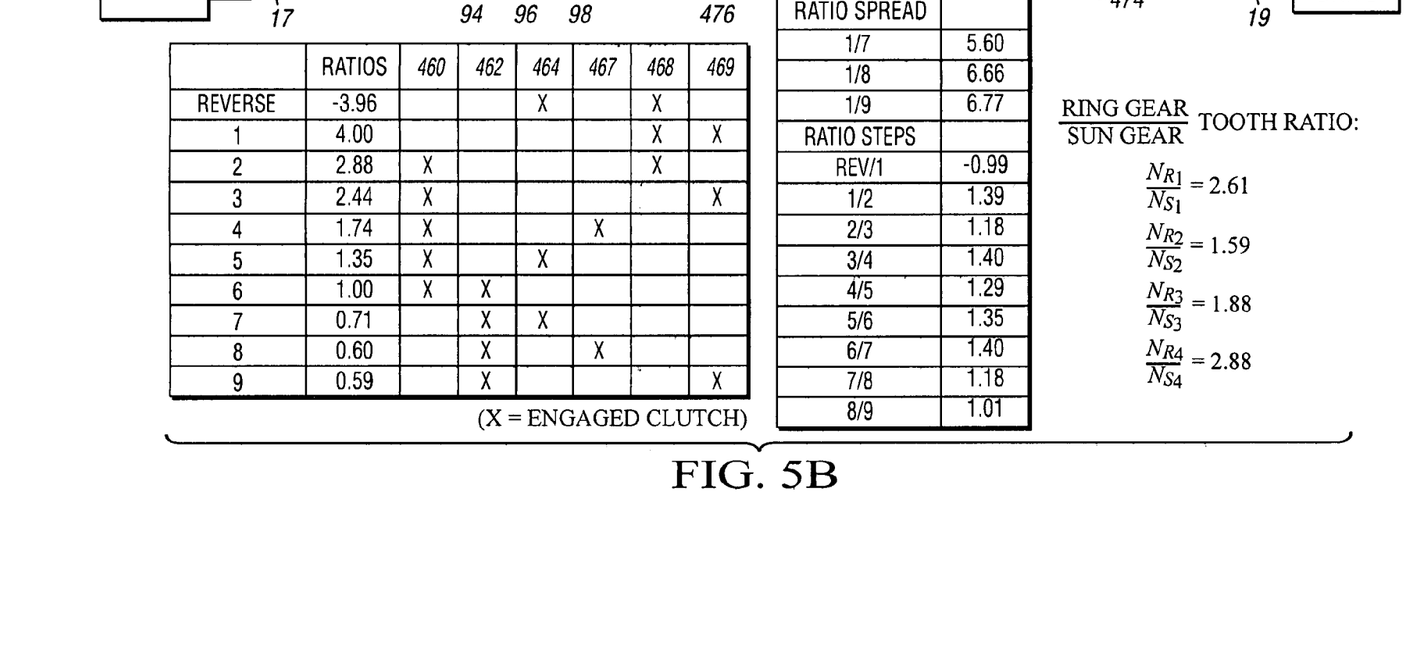
FIG. 5B is a truth table and chart depicting some of the operating characteristics of the powertrain shown in FIG. 5A.

The truth table of FIG. 5B describes the engagement sequence utilized to provide nine forward speed ratios and a reverse speed ratio in the planetary gear arrangement 418 shown FIG. 5A. As shown and described above for the configuration in FIG. 1A, those skilled in the art will understand from the truth table of FIG. 5B how the speed ratios are established with the planetary gear sets 420, 430, 440 and 450. The truth table of FIG. 5B also provides an example of the ratios that can be attained with the planetary gear arrangement 418 shown in FIG. 5A utilizing the sample tooth ratios given in FIG. 5B. The $N_{R1}/S_{R1}$ value is the tooth ratio of the planetary gear set 420; the $N_{R2}/S_{R2}$ value is the tooth ratio of the planetary gear set 430; the $N_{R3}/S_{R3}$ value is the tooth ratio of the planetary gear set 440; and the $N_{R4}/S_{R4}$ value is the tooth ratio of the planetary gear set a450. Also shown in FIG. 5B are the ratio steps between the single step ratios and the forward directions as well as the Reverse to first forward speed ratio step. For example, the first to second step ratio is 1.39. Notably, the planetary gear set 450 provides sustained operation at high output speed by connection of planet carrier assembly member 456 to the engine 12 via clutch 462 instead of overdrive output, thereby reducing centrifugal loading on the pinion bearings due to planet mass. This type of connection between the carrier member of the respective gear set 50, 150, 20 and 350 and the engine 12 via respective clutches 62, 162, 262 and 362 may be substituted in the transmissions of FIGS. 1A, 2A, 3A and 4A by replacing respective interconnecting members 72, 172, 272 and 372 with an interconnecting member between the respective planet carrier assembly members 46, 146, 246 and 346 and the planet carrier assembly members 56, 156, 256 and 356.

Nine-speed transmissions shown in FIGS. 1A through FIG. 5A have a ratio coverage that enables very high tractive effort necessary for high speed, small displacement engines, to provide a close step transmission for improved fuel economy, or to enable high tractive effort if used in an off road application. The substantially equal first speed ratio and reverse speed ratios may be desirable for towing as well as other applications. The ability to achieve nine forward speed ratios with only six clutches may represent a cost savings.

Finally, with the wide ratio coverage provided, the invention provides the possibility of eliminating additional driveline components necessary to provide additional tractive effort associated with off road, working, and trailer vehicles, thus resulting in potential cost savings.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
an input shaft;
an output shaft;
first, second, third and fourth planetary gear sets each having a first, a second and a third member, said members including a sun gear member, a ring gear member and a planet carrier assembly member;
one of said members of one of said planetary gear sets being continuously connected with a stationary member;
said input shaft being continuously connected with a member of said planetary gear sets and said output shaft being continuously connected with another member of said planetary gear sets;
a first interconnecting member continuously interconnecting said first member of said first planetary gear set with said first member of said second planetary gear set;
a second interconnecting member continuously interconnecting said second member of said second planetary gear set with one of said second member of said first planetary gear set and said first member of said third planetary gear set;
a third interconnecting member continuously interconnecting said second member of said third planetary gear set with said first member of said fourth planetary gear set;
a fourth interconnecting member continuously interconnecting said third member of said third planetary gear set with said second member of said fourth planetary gear set; and
six torque-transmitting mechanisms, operable for selectively interconnecting said members of said planetary gear sets with said input shaft, with said stationary member or with other members of said planetary gear sets, said six torque-transmitting mechanisms being engaged in combinations of two to establish nine forward speed ratios and one reverse speed ratio between said input shaft and said output shaft, wherein one of said torque-transmitting mechanisms is operable for selectively interconnecting one of said third member of said first planetary gear set with said first member of said third planetary gear set and said second member of said first planetary gear set with said third member of said second planetary gear set.

2. The multi-speed transmissions of claim 1, wherein said planet carrier assembly member of one of said planetary gear sets is a double-pinion carrier.

3. The multi-speed transmission of claim 1, wherein said member continuously connected with said stationary member is said planet carrier assembly member of one of said planetary gear sets.

4. The multi-speed transmission of claim 1, wherein each of said members of one of said planetary gear sets is continuously interconnected with a different member of another of said planetary gear sets or with said stationary member.

5. The multi-speed transmission of claim 1, wherein a first of said six torque-transmitting mechanisms is operable for selectively interconnecting said second member of said third planetary gear set with said input shaft.

6. The multi-speed transmission of claim 1, wherein a third of said six torque-transmitting mechanisms is operable for selectively interconnecting said third member of one of said first or second planetary gear sets with said first member of said third planetary gear set.

7. The multi-speed transmission of claim 1, wherein a fourth of said six torque-transmitting mechanisms is operable for selectively interconnecting said first member of said third planetary gear set with said stationary member.

8. The multi-speed transmission of claim 1, wherein a fifth of said six torque-transmitting mechanisms is operable for selectively interconnecting said second member of said fourth planetary gear set with said stationary member.

9. The multi-speed transmission of claim 1, wherein a lowest of said forward speed ratios is substantially equivalent to said reverse speed ratio.

10. The multi-speed transmission of claim 1, wherein forward ratio shifts and a forward/reverse shift are of the single transition type.

11. A multi-speed transmission comprising:
an input shaft;
an output shaft;
first, second, third and fourth planetary gear sets each having a first, a second and a third member, said members including a sun gear member, a ring gear member and a planet carrier assembly member, wherein said planet carrier assembly member of one of said planetary gear sets is a double-pinion carrier, said double-pinion carrier being continuously connected with a stationary member;
said input shaft being continuously connected with a member of said planetary gear sets and said output shaft being continuously connected with another member of said planetary gear sets;
a first interconnecting member continuously interconnecting said first member of said first planetary gear set with said first member of said second planetary gear set;
a second interconnecting member continuously interconnecting said second member of said second planetary gear set with one of said second member of said first planetary gear set and said first member of said third planetary gear set;
a third interconnecting member continuously interconnecting said second member of said third planetary gear set with said first member of said fourth planetary gear set;
a fourth interconnecting member continuously interconnecting said third member of said third planetary gear set with said second member of said fourth planetary gear set; and
six torque-transmitting mechanisms, operable for selectively interconnecting said members of said planetary gear sets with said input shaft, with said stationary member or with other members of said planetary gear sets, said six torque-transmitting mechanisms being engaged in combinations of two to establish nine forward speed ratios and one reverse speed ratio between said input shaft and said output shaft.

12. A multi-speed transmission comprising:
an input shaft;
an output shaft;
first, second, third and fourth planetary gear sets each having a first, a second and a third member, said members including a sun gear member, a ring gear member and a planet carrier assembly member;
one of said members of one of said planetary gear sets being continuously connected with a stationary member;
said input shaft being continuously connected with a member of said planetary gear sets and said output shaft being continuously connected with another member of said planetary gear sets;
a first interconnecting member continuously interconnecting said first member of said first planetary gear set with said first member of said second planetary gear set;
a second interconnecting member continuously interconnecting said second member of said second planetary gear set with one of said second member of said first planetary gear set and said first member of said third planetary gear set;
a third interconnecting member continuously interconnecting said second member of said third planetary gear set with said first member of said fourth planetary gear set;
a fourth interconnecting member continuously interconnecting said third member of said third planetary gear set with said second member of said fourth planetary gear set; and
six torque-transmitting mechanisms, operable for selectively interconnecting said members of said planetary gear sets with said input shaft, with said stationary member or with other members of said planetary gear sets, said six torque-transmitting mechanisms being engaged in combinations of two to establish nine forward speed ratios and one reverse speed ratio between said input shaft and said output shaft, wherein a second of said six torque-transmitting mechanisms is operable for selectively interconnecting said third member of said third planetary gear set with said input shaft.

13. A multi-speed transmission comprising:
an input shaft;
an output shaft;
first, second, third and fourth planetary gear sets each having a first, a second and a third member, said members including a sun gear member, a ring gear member and a planet carrier assembly member;
one of said members of one of said planetary gear sets being continuously connected to a stationary member;
said first member of said first planetary gear set being continuously connected with said first member of said second planetary gear set and said input shaft;
said second member of said second planetary gear set being continuously interconnected with one of said second member of said first planetary gear set and said first member of said third planetary gear set;
said second member of said third planetary gear set being continuously interconnected with said first member of said fourth planetary gear set;
said third member of said third planetary gear set being continuously interconnected with said second member of said fourth planetary gear set;
said third member of said fourth planetary gear set being continuously interconnected with said output shaft;

a first torque-transmitting mechanism operable for selectively interconnecting said second member of said third planetary gear set with said input shaft;

a second torque-transmitting mechanism operable for selectively interconnecting said third member of said third planetary gear set with said input shaft;

a third torque-transmitting mechanism operable for selectively interconnecting said third member of one of said first or second planetary gear sets with said first member of said third planetary gear set;

a fourth torque-transmitting mechanism operable for selectively interconnecting said first member of said third planetary gear set with said stationary member;

a fifth torque-transmitting mechanism operable for selectively interconnecting said second member of said fourth planetary gear set with said stationary member;

a sixth torque-transmitting mechanism operable for selectively interconnecting one of said third member of said first planetary gear set with said first member of said third planetary gear set and said second member of said first planetary gear set with said third member of said second planetary gear set; and said six torque-transmitting mechanisms being operable in combinations of two to provide nine forward speed ratios and one reverse speed ratio.

14. The multi-speed transmission of claim 13, wherein said planet carrier assembly member of one of said planetary gear sets is a double-pinion carrier.

15. The multi-speed transmission of claim 14, wherein said member continuously connected with said stationary member is said planet carrier assembly member of one of said planetary gear sets.

16. The multi-speed transmissions of claim 14, wherein each of said members of one of said planetary gear sets is continuously interconnected with a different member of another of said planetary gear sets or with said stationary member.

17. The multi-speed transmissions of claim 13, wherein a lowest of said forward speed ratios is substantially equivalent to said reverse speed ratio.

18. A multi-speed transmission comprising:

an input shaft;

an output shaft;

first, second, third and fourth planetary gear sets, each of said planetary gear sets having a first, a second and a third member, said members including a sun gear member, a planet carrier assembly member and a ring gear member;

six torque transmitting mechanisms, each of said torque transmitting mechanisms being operable for selectively interconnecting one of said members of said planetary gear sets with said input shaft, with a stationary member or with another of said members of said planetary gear sets;

said input shaft being continuously connected with two of said planetary gear sets and being selectively connectable with the other two of said planetary gear sets via either one of two of said six torque transmitting mechanisms;

said output shaft being continuously connected with one of said members of one of said planetary gear sets, each of the other of said members of said one of said planetary gear sets being continuously connected with a respective member of another of said planetary gear sets; and said six torque transmitting mechanisms being engaged in combinations of two to establish nine forward speed ratios and a reverse speed ratio between said input shaft and said output shaft.

* * * * *